(12) United States Patent
Klippert et al.

(10) Patent No.: US 8,375,691 B2
(45) Date of Patent: Feb. 19, 2013

(54) SYNTHETIC FIBER ROPE WITH COUPLING ELEMENT

(75) Inventors: Uwe Klippert, Roedental (DE); Steffen Brosius, Weitramsdorf (DE); Alwin Macht, Ebensfeld (DE); Hans-Ulrich Karsch, Grub am Forst (DE); Juergen Schlembach, Coburg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 105 days.

(21) Appl. No.: 12/996,363

(22) PCT Filed: Jun. 2, 2009

(86) PCT No.: PCT/EP2009/056744
§ 371 (c)(1),
(2), (4) Date: Dec. 10, 2010

(87) PCT Pub. No.: WO2009/147140
PCT Pub. Date: Dec. 10, 2009

(65) Prior Publication Data
US 2011/0094370 A1    Apr. 28, 2011

(30) Foreign Application Priority Data

Jun. 3, 2008 (DE) .................. 10 2008 026 804
May 8, 2009 (DE) .................. 10 2009 021 055

(51) Int. Cl.
*D01H 17/00* (2006.01)
(52) U.S. Cl. ......................................................... 57/23
(58) Field of Classification Search ...... 57/23; 403/275, 403/283, 291; 411/446, 447, 450, 451.1, 411/456–460
See application file for complete search history.

(56) References Cited

U.S. PATENT DOCUMENTS
(Continued)

FOREIGN PATENT DOCUMENTS
CH    304123    3/1955
DE    528 620    6/1931
(Continued)

OTHER PUBLICATIONS

International Preliminary Report on Patentability, dated Dec. 6, 2010, corresponding to PCT/EP2009/056744, 9 pages.
(Continued)

*Primary Examiner* — Shaun R Hurley
(74) *Attorney, Agent, or Firm* — Christie, Parker & Hale, LLP (57) ABSTRACT

A synthetic fiber rope with coupling element for transmitting an adjustment force to an adjustable part to be connected to the rope via the coupling element is provided. The coupling element is attached to the rope as an element separate from the rope. The coupling element at least partly engages in the interior of the rope and there engages behind rope components made of synthetic fibers, wherein the coupling element completely reaches through the rope transverse to its local direction of extension and protrudes beyond the outer surface of the rope. A base of the coupling element resting against the outer surface of the rope and extending along a portion of the outer surface of the rope. A succeeding component is attached to the coupling element in that it is press-fitted with the coupling element, such that material of the succeeding component is deformed and rope components being compacted in the region of the coupling element.

23 Claims, 8 Drawing Sheets

U.S. PATENT DOCUMENTS

| | | | |
|---|---|---|---|
| 1,197,073 A | | 9/1916 | Smith |
| 1,197,078 A | | 9/1916 | Smith |
| 1,808,075 A | | 6/1931 | Rothschild |
| 2,607,094 A | * | 8/1952 | Nicosia ......................... 403/274 |
| 3,267,539 A | | 8/1966 | Mark |
| 3,466,712 A | * | 9/1969 | Behney ......................... 403/283 |
| 3,704,488 A | | 12/1972 | Higgins |
| 4,534,097 A | * | 8/1985 | Mason ......................... 29/432.2 |
| 4,955,750 A | * | 9/1990 | Goran ........................... 403/306 |
| 5,582,447 A | | 12/1996 | Leon et al. |
| 5,813,790 A | * | 9/1998 | Goran, Jr. ..................... 403/283 |
| 5,987,710 A | * | 11/1999 | Paul et al. ....................... 24/130 |
| 6,050,029 A | | 4/2000 | Simon et al. |
| 6,508,051 B1 | | 1/2003 | De Angelis |
| 7,699,363 B2 | | 4/2010 | Langfermann et al. |
| 2004/0040401 A1 | | 3/2004 | Liao |
| 2005/0011130 A1 | * | 1/2005 | Klippert et al. ................. 49/352 |
| 2006/0254145 A1 | | 11/2006 | Langfermann et al. |
| 2008/0080928 A1 | * | 4/2008 | Joubert et al. ................ 403/349 |
| 2010/0209185 A1 | | 8/2010 | Kirth et al. |

FOREIGN PATENT DOCUMENTS

| | | |
|---|---|---|
| DE | 902 695 | 5/1983 |
| DE | 34 13 100 A1 | 10/1985 |
| DE | 196 19 057 A1 | 11/1997 |
| DE | 196 54 851 C1 | 6/1998 |
| DE | 696 15 824 T2 | 6/2002 |
| DE | 101 47 452 A1 | 4/2003 |
| DE | 103 31 001 A1 | 4/2004 |
| DE | 103 31 003 A1 | 4/2004 |
| DE | 20 2005 006 942 U1 | 10/2006 |
| DE | 10 2007 046 916 A1 | 5/2008 |
| EP | 0 805 252 A2 | 11/1997 |
| EP | 1 061 172 A2 | 12/2000 |
| FR | 2 881 488 A1 | 8/2006 |
| GB | 166797 | 6/1920 |
| GB | 229116 | 2/1925 |
| JP | 01-003310 A | 1/1989 |
| JP | 64-3310 | 1/1989 |
| WO | WO 95/01492 | 1/1995 |
| WO | WO 96/26372 | 8/1996 |
| WO | WO 98/02675 | 1/1998 |
| WO | WO 2009/003207 A1 | 1/2009 |
| WO | WO 2009/147140 A1 | 12/2009 |

OTHER PUBLICATIONS

International Search Report, dated Oct. 16, 2009, corresponding to PCT/EP2009/056744; 6 sheets.

* cited by examiner

SYNTHETIC FIBER ROPE WITH COUPLING ELEMENT

CROSS-REFERENCE TO A RELATED APPLICATION

This application is a National Phase Patent Application of International Patent Application Number PCT/EP2009/056744, filed on Jun. 2, 2009, which claims priority of German Patent Application Number 10 2008 026 804.6, filed on Jun. 3, 2008, and of German Patent Application Number 10 2009 021 055.5, filed on May 8, 2009.

BACKGROUND

This invention relates to a synthetic fiber rope with a coupling element for transmitting an adjustment force (tensile force) acting on the rope to an adjustable part to be connected with the rope via the coupling element.

It is known to use ropes as flexible pulling means, via which a driving torque generated by a drive, e.g. by a hand-operated drive (crank drive) or a power-operated drive (electromotive drive), or an associated adjustment force can be transmitted to an adjustable part connected to the rope, such as to an adjustable element of a motor vehicle, in order to transfer the adjustable part into a specifiable adjusted position.

For connecting an adjustable part to a rope it is common practice that an element separate from the rope, which here is referred to as coupling element, is attached to the rope, which in turn—directly or indirectly via additional interface elements—is connected with the adjustable part to be connected to the rope.

In motor vehicle window lifters in which an adjustable window pane of a motor vehicle forms an adjustable part, it is provided, for example, to attach a so-called rope nipple to a rope which transmits an adjustment force generated by a window lifter drive to the adjustable window pane, which rope nipple extends around the circumference of a portion of the rope referred to as connecting portion and to which the adjustable part to be connected to the rope can be attached, e.g. in that the rope nipple (positively) engages in the adjustable part. For this purpose, the latter for example can include a so-called nipple chamber into which the rope nipple can be inserted such that in operation of the window lifter it is positively held therein. The nipple chamber regularly is provided not at the adjustable window pane itself, but rather at a so-called carrier connected with the window pane (in the region of its lower pane edge), which carries along the window pane during a respective adjusting movement.

Correspondingly, it is known to adjust a seat part of a motor vehicle by using a flexible pulling means in the form of a rope, in that the rope on the one hand is operatively connected with a drive serving to generate an adjustment force and on the other hand is coupled with an adjustable seat part via a coupling element provided at the rope.

When using a synthetic fiber rope, i.e. a rope made of synthetic fibers (plastic rope), as pulling means for transmitting an adjustment force to an adjustable part to be connected to the rope, it was found that under the influence of large forces in continuous operation of the adjusting means a rope nipple used for connecting said adjustable part possibly is not able to maintain its intended mounting position at the connecting portion of the rope provided for this purpose. This is due to the fact that the connection between the rope nipple and the rope has no sufficient stability, in order to permanently withstand the loads occurring in operation of the adjusting means, so that the rope nipple (in particular by slipping along the direction of extension of the rope) loses its intended mounting position at the rope.

SUMMARY

It is the problem underlying the invention to improve a synthetic fiber rope with coupling element for an adjusting means to the effect that the coupling element and possibly a further interface element connected therewith rather maintains its intended mounting position at the rope in operation of the adjusting means, even under great loads.

According to an exemplary embodiment of the invention, the coupling element provided at the rope, via which an adjustable part can be connected to the rope, at least partly engages into the interior of the rope and there engages behind rope components made of synthetic fibers.

Said rope components for example can be (spun) threads of the rope, which are formed of the synthetic fibers, and/or rope strands which each are formed (twisted together) of several threads and which are twisted to create the rope.

The solution in accordance with the invention has the advantage that due to the engagement of the coupling element into the interior of the rope, the former engaging behind rope components made of synthetic fibers, such as threads and/or strands of the rope, a particularly firm, durable connection between the coupling element and the rope is achieved, so that the coupling element and an adjustable part thereby connected to the rope can reliably be held in a defined position at the rope even with large adjustment forces.

As compared to a metal rope, in particular a steel rope, the use of a plastic rope (synthetic fiber rope) as flexible pulling means in an adjusting means, which thereby is made possible, has the advantage that on winding up the plastic rope—because of its comparatively greater elasticity and flexibility—very small radii of curvature can be generated, which opens up new possibilities when selecting the gear ratio in the drive train of the adjusting means, and in particular provides for saving a transmission stage, whereby weight and costs can be reduced. For example, a sufficiently flexible and elastic plastic rope possibly can be wound up directly onto an output shaft of an adjusting drive or onto a winding element arranged thereon, whereas for winding a comparatively more rigid steel rope a rope drum of comparatively larger diameter should be provided, which via additional transmission elements is operatively connected with the associated output shaft of the adjusting means.

A particular stability of the connection between the coupling element and the rope can be achieved when the penetration depth of the coupling element into the rope—as seen from the outer surface of the rope—amounts to at least three times, in particular at least five times the mean diameter of the threads forming the rope, which are made of synthetic fibers.

The structural elements of the coupling element engaging into the rope advantageously should be designed such that they come to lie between threads or strands of the rope without damaging the same. For this purpose, for example, the free ends of the structural elements can be provided with inclined surfaces or conical surfaces, which should rather be free from sharp edges.

Furthermore, a combination of comparatively finer and comparatively coarser structural elements can be associated in a coupling element, of which the former engage between individual threads and the latter engage between strands of the rope.

The preferred penetration depth depends on the shape, size and number of the structural elements and on the desired stability of the connection between rope and coupling element.

On the one hand, the coupling element can constitute an insert, which is inserted into a rope portion (connecting portion of the rope) and which advantageously completely extends through the rope transverse to its direction of extension, i.e. extends from the interior of the rope to opposed regions of the outer surface of the rope.

Furthermore, the coupling element can be provided at the outer circumference of the rope, i.e. enclose the same e.g. along its outer surface, wherein at least one structural element, in particular a plurality of structural elements, of the coupling element protrude from its base body extending along the outer surface of the rope and engage into the interior of the rope, e.g. with a penetration depth of at least 30% or also of at least 50% of the rope diameter. With a penetration depth of at least 50%, the structural elements protruding from the outer surface into the rope interior can be brought in engagement with each other in the interior of the rope, e.g. in that they are entangled with each other. In this way, an even firmer connection between the coupling element and the rope is created.

Independent of the concrete geometrical design of the coupling element, the same—as seen from the interior of the rope—advantageously at least partly protrudes beyond the outer surface of the rope. This means that the coupling element protrudes beyond the outer circumference of the rope in radial direction—based on a center line extending in direction of extension of the rope. In this way, the coupling element (via the regions protruding from the rope) can directly, i.e. without interposition of components of the rope, be brought in contact with a succeeding component, to which a tensile force acting on the rope is to be transmitted as intended by means of the coupling element.

The component provided after of the coupling element and in direct contact with the same one the one hand can directly be the adjustable part itself, whose position can be adjusted by means of adjustment forces acting on the rope. On the other hand, however, this can also be an interface element, via which an adjustable part is connected with the coupling element. For example, the component provided after the coupling element can be a rope nipple which encloses the rope (at a connecting portion) at its circumference and to which in turn the adjustable part to be connected to the rope can be attached, e.g. in that the rope nipple positively engages in a nipple chamber of the adjustable part. Such rope nipple regularly encloses the rope (in the rope portion/connecting portion thereof provided with the coupling element) in a tubular manner, wherein it acts on the coupling element and possibly on the rope with its inner surface.

The component provided after the coupling element, e.g. in the form of a rope nipple, can be molded to the coupling element in accordance with one embodiment, so that between the same a frictional and preferably also a positive connection exists. In this case, plastics is particularly useful as material for the succeeding component. On the other hand, the succeeding component as an element separate from the coupling element can frictionally and/or positively be connected with the coupling element, in particular also be press-fitted with the same. This results in a compaction of the rope in the region of the coupling element.

Advantageously, it is provided that the coupling element and a component provided after the coupling element support on each other in loading direction, i.e. along a direction along which tensile forces acting on the rope can be transmitted from the coupling element to the succeeding component, e.g. in that a corresponding supporting portion (protruding from the outer surface of the rope) is provided at the coupling element, on which a succeeding component can support.

The coupling element consists of a material more dimensionally stable than the rope, in particular of metal or a sufficiently strong plastic material, so that when engaging behind individual threads or strands of the rope a sufficiently firm connection between rope and coupling element can be produced and the coupling element in addition has a sufficient strength, in order to transmit tensile forces acting on the rope to a succeeding component without causing any damage.

The coupling element for example can be a clamp which is fixed to the rope. Furthermore, the coupling element can constitute a crimp part, which first (in the manner of an open ring) is put onto the rope, so that it encloses the same (initially under an angle of less than 360°) and which then is pressed against the outer surface of the rope, wherein structural elements protruding from the base body of the coupling element in the direction of the interior of the rope are pressed into the rope and there engage behind threads/strands of the rope. In addition, the free ends of the coupling element (designed as open ring) possibly can penetrate into the rope.

The coupling element for example can also constitute a wire shape, a cold-formed part, a light-metal extruded part, a casting or also a so-called roll-and-crimp part.

BRIEF DESCRIPTION OF THE DRAWINGS

Further details and advantages of the invention will become apparent from the following description of embodiments with reference to the Figures.

DETAILED DESCRIPTION

Figure 13:
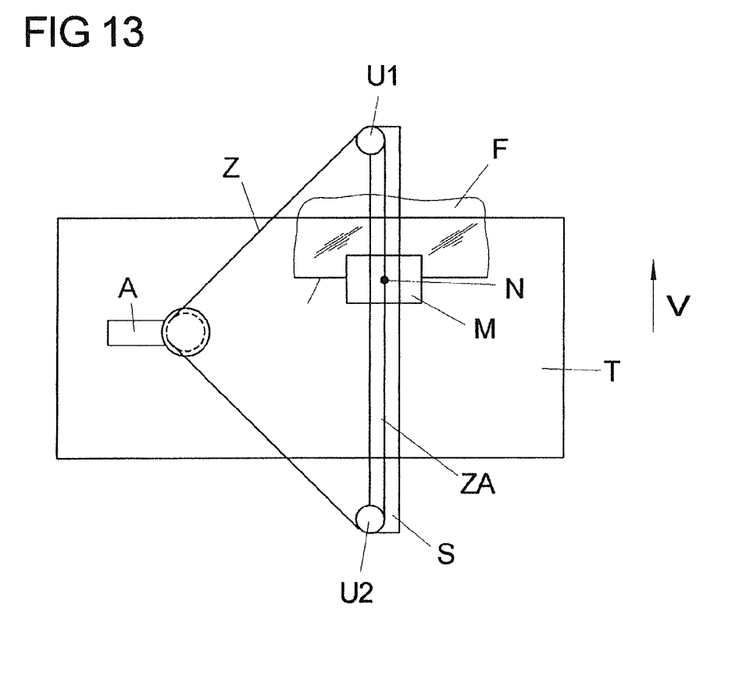
FIG. 13 shows a schematic representation of an adjusting means for a motor vehicle in the form of a motor vehicle window lifter.

FIG. 13 schematically shows a window lifter arranged on a supporting motor vehicle part T, such as an assembly carrier of a motor vehicle door, with a drive A, e.g. in the form of an electromotive drive, but alternatively also in the form of a hand-operated drive which drives a flexible pulling means Z, which for this purpose is wound around an output-side transmission element of the drive A, so that in the case of a rotary movement (effected by the drive A) of said transmission element the flexible pulling means Z is moved along its direction of extension.

The flexible pulling means Z is deflected and guided by means of two deflecting elements U1, U2 such that a pulling means portion ZA extends along a guide rail S of the window lifter, which in turn extends along the adjustment direction V of the window pane F to be adjusted by means of the window lifter. On the guide rail S a carrier M is movably guided along the adjustment direction V of the window pane F, which on the one hand is connected to the flexible pulling means Z, more exactly to its pulling means portion ZA, via a rope nipple N, and which on the other hand carries the adjustable window pane F. For this purpose, the rope nipple N attached to the flexible pulling means Z on the one hand can positively be accommodated in an associated nipple chamber of the carrier M and on the other hand the carrier M can clampingly receive the window pane F in the region of its lower edge U.

Such adjusting means for a motor vehicle in the form of a so-called rope window lifter is generally known, see for example DE 196 19 057 A1, DE 196 54 851 C1, DE 101 47 452 A1, DE 103 31 001 A1 and DE 103 31 003 A1. Adjusting means with a pulling means as power transmission element furthermore are employed in motor vehicles for adjusting sliding roofs, seat parts, lock parts etc. In addition, flexible pulling means for transmitting tensile forces to an adjustable part are also utilized outside the field of motor vehicles.

In the present case, the flexible pulling means Z is meant to be a rope and in particular a synthetic-fiber or plastic rope, which is made on the basis of synthetic fibers. Materials suitable for this purpose include for example polyester, polyamide, polypropylene and polyethylene.

As compared to a metal rope, in particular a steel rope, as it is typically used in adjusting means in motor vehicles, a plastic rope has the advantage that due to its comparatively greater flexibility and elasticity with a very small radius of curvature it can be wound around a winding element with correspondingly small diameter, whereas metal ropes, in particular steel ropes, are wound around rope drums which have a comparatively large diameter. When using a plastic rope as flexible pulling means—compared with the use of a metal rope, in particular steel rope—one transmission stage—proceeding from the drive motor of an adjusting drive—thereby can be saved, as on the drive side the plastic rope can be wound around a comparatively fast rotating winding element (e.g. arranged on a motor shaft) of small diameter, whereas on the drive side the metal or steel rope must be wound around a comparatively slower rotating winding element (rope drum) with correspondingly larger diameter.

Figure 14:
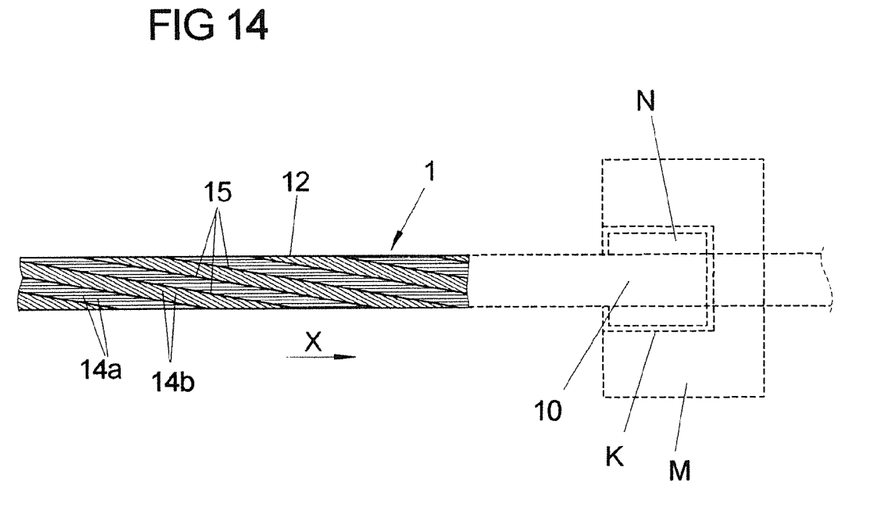
FIG. 14 shows a schematic representation of a rope for use in an adjusting means.

The basic structure of a rope, in particular a synthetic fiber rope, is indicated in FIG. 14. The rope 1 is made of synthetic fibers from which threads 14a, 14b are formed (spun), whose diameter can be e.g. about 1 mm. The individual threads 14a, 14b in turn are combined (twisted together) to a plurality of so-called strands 15, which are twisted to form the rope. Typically, three or four rope strands 15 are twisted with each other to form a rope.

In the present case, a rope with oppositely directed strands is shown in FIG. 14 merely by way of example, in which the threads 14a, 14b of adjacent strands 15 each are twisted together in different directions. Here, this has merely been effected for the purpose of more clearly delimiting adjacent rope strands 15 against each other. The rope 1 likewise can be a Lang lay rope, in which the threads of adjacent strands have the same spatial orientation. Lang lay ropes generally are more pliable and flexible than so-called reverse lay ropes.

In the following, it will generally be assumed that the used rope 1 each is a synthetic fiber rope whose components 14a, 14b, 15 are made of synthetic fibers, independent of how the individual components 14a, 14b, 15 are designed in detail. Only by way of example, these are threads spun out of the synthetic fibers, which in turn are laid together to form a plurality of rope strands 15, by twisting of which the rope 1 is formed.

As is furthermore schematically indicated in FIG. 14, it is possible for connecting an adjustable part, here in the form of a carrier M carrying a window pane, to the rope 1 to attach a so-called rope nipple N to each rope 1, which encloses the rope 1 on its outer circumference, i.e. its outer surface 12, and for example positively engages in a so-called nipple chamber K of the carrier M, in order to produce a positive connection between carrier M and rope nipple N. In this way, the carrier M is connected to the rope 1 via the rope nipple N (engaging in its nipple chamber K). The rope portion to which the rope nipple N or some other coupling element is attached, here is also referred to as connecting portion 10.

In practice it was found, however, that especially in synthetic fiber ropes it can occur in operation, i.e. under the influence of large tensile forces, that the connection between the rope nipple N and the rope 1 is not stable enough to withstand the loads occurring under the influence of large tensile forces, so that the rope nipple N can slip with respect to the rope 1 in longitudinal direction x of the rope.

Subsequently, measures therefore are represented of how to attach a coupling element—which serves for coupling the rope to a succeeding adjustable part (of a motor vehicle)—to a rope 1 in the form of a synthetic fiber rope, which even under great loads maintains its intended mounting position at the rope 1, more exactly at a connecting portion 10 of the rope 1 provided for this purpose.

Figure 1:
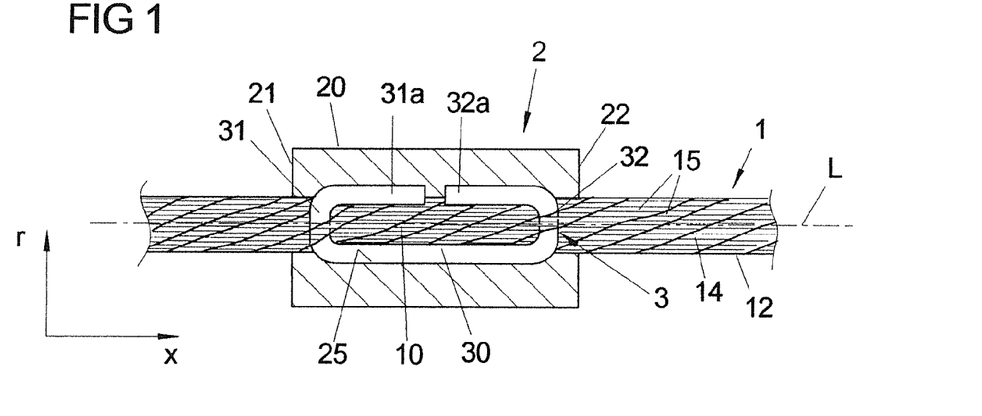
FIG. 1 shows a first embodiment of a rope with coupling element, wherein the coupling element constitutes an insert in the form of a clamp and serves for connection of a further component in the form of an interface element to the rope.

FIG. 1 shows a section of a rope 1 in the form of a synthetic fiber rope or plastic rope, which extends along a center line L (extending at least partly curved), which each locally extends along a longitudinal direction x of the rope, and which is meant to serve the power transmission between a manual or motorized drive and an adjustable part, in particular an adjustable part of a motor vehicle, as shown in FIG. 13 by way of example, so that correspondingly large forces can act on the rope 1, when an adjusting torque or an adjusting force is applied by means of the associated drive, in order to actuate said adjustable part.

As shown in FIG. 14 by way of example, the rope 1 can be produced in the usual way by twisting rope strands or strand bundles 15, which in turn are made of synthetic fibers, for example in that the synthetic fibers are spun to threads 14a, 14b, cf. FIG. 14, which are twisted with each other to form the strands 15.

To a portion of the rope 1 here referred to as connecting portion 10, a (tubular or hollow cylindrical) rope nipple 2 is attached, which annularly encloses the rope and extends along the direction of extension x of the rope 1 between a first end face 21 and a second end face 22. The rope nipple 2 furthermore includes an outer surface 20 facing away from the rope 1 and an inner surface 25 (inner wall) facing the rope 1, via which latter the rope nipple 2 is connected to the rope 1.

Via its outer surface 20 and/or at least one end face 21, 22, the rope nipple 2 can (positively) be brought in engagement with an associated adjustable part, such as a carrier of a window pane, cf. FIG. 13, a seat part of a motor vehicle, a carrier of a sliding roof or a lock part, in order to connect said adjustable part to the rope. For this purpose, the adjustable part, as shown in FIG. 14, can include a so-called nipple chamber into which the rope nipple 2 can be inserted. In this case, the rope nipple 2 forms an interface element between the rope 1 and the associated adjustable part.

To ensure a defined, permanent positioning and fixation of the rope nipple 2—and hence also of the associated adjustable part—at a certain point of the rope 1, namely at its connecting portion 10, even under the influence of large tensile forces when using the rope 1 in an adjusting means, a coupling element 3, here in the form of an insert, is inserted into the connecting portion 10 of the rope 1, which advantageously is made of a material more dimensionally stable as compared to the material of the rope 1, e.g. of metal.

In the present case, the coupling element 3 is designed as (metallic) clamp (made of wire) or as wire shape, which includes a base region 30 (extending in direction of extension x of the rope 1) as well as two structural elements 31, 32 protruding therefrom (spaced from each other along the direction of extension x of the rope 1) each in the form of a leg, which (completely) penetrate the rope 1 along a direction r (radial direction) transverse to its direction of extension x, whereas the base region 30 substantially extends along a portion of the outer surface 12 of the rope 1. The two structural elements 31, 32 in the form of legs are bent over at their respective free end 31a, 32a such that the free ends 31a, 32a of the coupling element 3 extend substantially parallel to the base region 30, namely in particular at a portion of the outer surface 12 of the rope 1 opposite the base region 30.

In the present case, the direction of extension x of the rope 1 each should be understood only locally, as in use as (flexible) pulling means the rope 1 in general extends at least partly curved in an adjusting drive.

The structural elements 31, 32 of the coupling element 3 penetrating the rope 1 (transverse to its direction of extension x and completely) engage between adjacent strands 15a and/or adjacent threads 14 in the interior of the rope 1—depending on the size of the cross-section of said structural elements 31, 32—, cf. FIG. 14, whereby a particularly firm, positive and frictional connection between the coupling element 3 and the rope 1 is made in the interior of the rope 1. Furthermore, the coupling element 3 both with the base region 30 and—radially opposite—with the bent free ends 31a, 32a of the structural elements 31, 32 (transverse to the direction of extension x of the rope 1) each protrudes beyond the outer surface 12 of the rope 1, so that there a connection can be made with the rope nipple 2—as interface element to a succeeding adjustable part M, see FIG. 14.

The structural elements 31, 32 and in particular their free ends 31a, 32a rather are designed without sharp edges and possibly with inclined surfaces (conical surfaces) at their ends, in order to prevent that threads of the rope 1 are damaged on a larger scale, when the coupling element 3 in the form of a clamp is inserted into the rope 1—vertical to the longitudinal direction x, i.e. in radial direction r—and subsequently the free ends 31a, 32a of the structural elements 31, 32 are bent over.

When after integrating the coupling element 3 in the form of a clamp into the connecting portion 10 of the rope 1 the rope nipple 2 is attached to the connecting portion 10 of the rope 1, for example in that the nipple 2 (advantageously made of plastics) is press-fitted/squeezed with the rope 1 in the region of the coupling element 3 or molded thereto, wherein part of the material of the rope nipple 2 is deformed around or flows around the coupling element 3, the inner surface 25 of the rope nipple 2 engages behind the partial regions of the coupling element 3 (radially) protruding beyond the outer surface 12 of the rope 1, in particular at its base region 30 and at the bent free ends 31a, 32a, so that in the region of its inner surface 25 along the direction of extension x of the rope 1 the rope nipple 2 can support on the coupling element 3, more exactly on its base region 30 and/or on its bent free ends 31a, 32a.

When overmolding the rope 1 in the region of the coupling element 3 to form the rope nipple 2, or when attaching the rope nipple 2 to the rope 1 in the region of the coupling element 3 by press-fitting, the components of the rope 1, such as threads 14 and strands 15, each are compacted in the region of the coupling element, whereby the connection between coupling element 3 and rope 1 is even strengthened. It is advantageous, however, when already before mounting the rope nipple 2 the connection between coupling element 3 and rope 1 is sufficiently durable (secure against loss), in order to provide for a preliminary examination of the connection. After mounting the rope nipple 2, the connection between coupling element 3 and rope 1 no longer is easily accessible for a quality check.

Due to the described support of the rope nipple 2 on the coupling element 3 in the form of a clamp in direction of extension of the rope x, the rope nipple 2 remains in its intended position at the coupling element 3 even under the influence of large forces acting along the direction of extension of the rope x.

The coupling element 3 (in the form of a clamp) itself maintains the intended position taken after integration into the rope 1 even under the influence of large tensile forces and associated loads, because the coupling element 3 reaches between the strands 15 and/or threads 14 of the rope 1 with its legs 31, 32 and thereby is immovably integrated in the rope 1. For this purpose it is advantageous that parts of the coupling element 3, here the structural elements 31, 32 formed as legs, extend transverse to the direction of extension x of the rope.

As a result, there is thus obtained a firm, positive and possibly frictional connection on the one hand between the coupling element 3 and the rope 1 and on the other hand between the rope nipple 2 and the coupling element 3, so that the rope nipple 2 is connected to the rope 1 in a certain position in a defined and durable way via the coupling element 3. In the present case, the rope nipple 2 forms an interface element which must be connected with a succeeding adjustable part, so that tensile forces acting on the rope can be transmitted to said adjustable part via the coupling element 3 and said interface element 2.

As explained already, the rope nipple 2 advantageously consists of a material which is plastically deformable or moldable under the influence of force, i.e. for example of plastics or metal, in particular light metal.

For the coupling element 3 which here is formed as clamp a sufficiently firm and at the same time deformable material is used, in particular metal (e.g. steel, light metal, in particular a light metal alloy, foamed and possibly porous metals) or a suitable plastic material.

Figure 2:
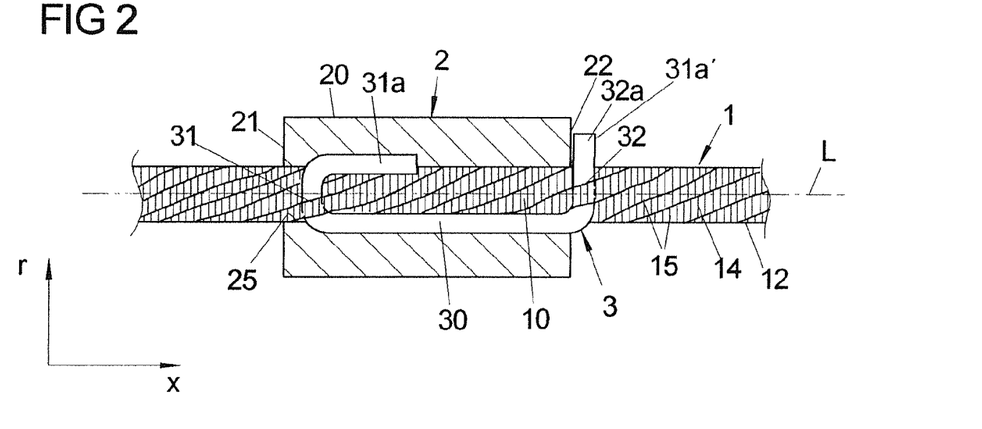
FIG. 2 shows a first modification of the embodiment of FIG. 1.

FIG. 2 shows a modification of the embodiment of FIG. 1 with a coupling element 3 provided at the rope 1 in the form of a clamp, which in its structure largely corresponds with the coupling element 3 of FIG. 1, wherein a difference, however, consists in that the free end 31a' of the second structural element 32 of the coupling element 3 here is not bent over, but rather distinctly extends radially beyond the rope 1 and its outer surface 12. In this way, a large-surface stop is created, via which the rope nipple 2 can support on the coupling element 3 with an end face 22.

Figure 3:
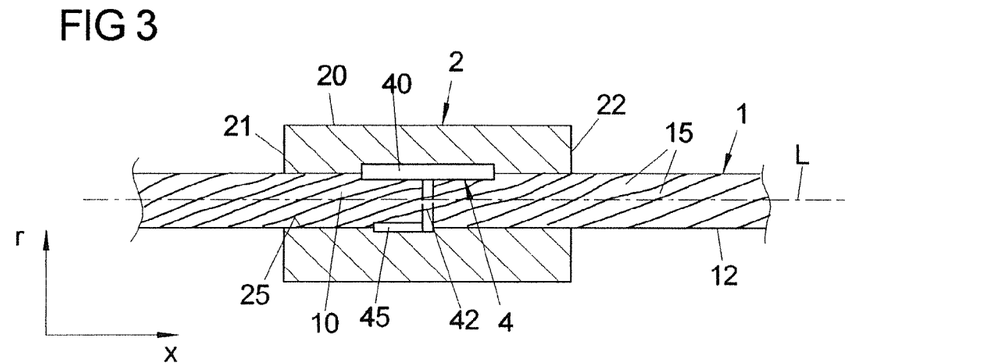
FIG. 3 shows a second modification of the embodiment of FIG. 1.

FIG. 3 shows a modification of the embodiment of FIG. 1 in terms of the design of the coupling element 3 formed as clamp, which in the embodiment of FIG. 3 consists of a first base region 40 extending in direction of extension x of the rope 1, a structural element 42 transversely protruding therefrom (in radial direction r), and a second base region 45 opposite the first base region 40, which is connected with the first base region 40 via said structural element 42 in the form of a leg. Both base regions 40, 45 extend substantially parallel to each other on opposed portions of the outer surface 12 of the rope 1 along its direction of extension x.

Since the coupling element 4 with its two base regions 40, 45 each protrudes beyond the outer surface 12 of the rope 1 (in radial direction r), a correspondingly firm connection with a succeeding component, e.g. an interface element 2 in the form of a rope nipple, can be produced there, as described already with reference to FIG. 1, which is based on a positive and possibly also a frictional connection.

Figure 4A:
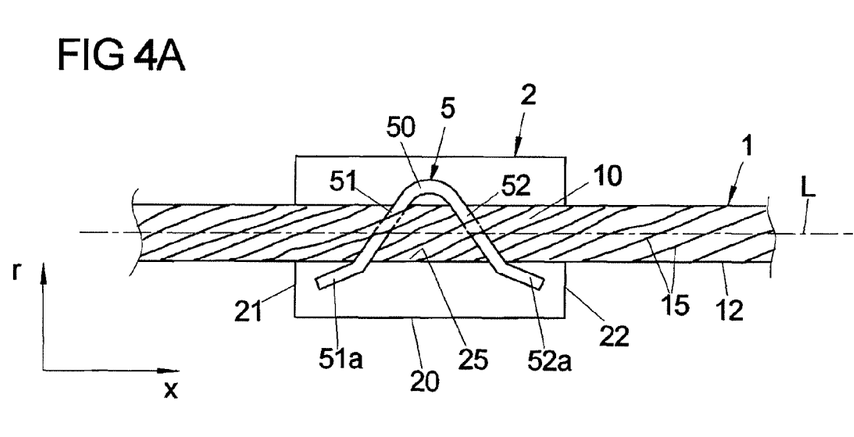
FIG. 4A shows a third modification of the embodiment of FIG. 1.

FIG. 4A shows a synthetic fiber rope 1 with a coupling element 5 in the form of a U- or V-clamp, in which two structural elements 51, 52 in the form of one leg each protrude from a base 50 which is provided on the outer surface 12 of the rope 1. The two structural elements 51,52 penetrate the rope 1 along a direction r vertical to the direction of extension x of the rope 1, but without extending vertical to said direction of extension x. At their free ends 51a, 52a, the structural elements 51, 52 each are bent over, where they do not lie flat on the outer surface 12 of the rope 1, but rather (obliquely) protrude from the same.

Due to the fact that in the clamp-like coupling element 5 of FIG. 4A both its base 50 and the free ends 51a, 52a of its legs 51, 52 each substantially protrude from the outer surface 12 of the rope 1, such coupling element is suitable in particular for attaching a rope nipple 2 to the rope 1 by overmolding the rope 1 in the region of the coupling element 5, wherein both the base 50 and the free ends 51a, 52a of the coupling element 5 each substantially protrude into the nipple 2 generated by injection molding and thereby fix the same to the rope 1.

Figure 4B:
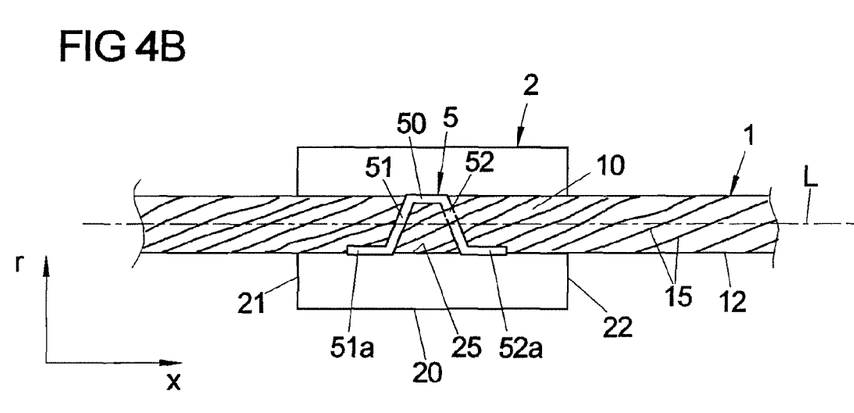
FIG. 4B shows a variant of the embodiment of FIG. 4A.

The arrangement shown in FIG. 4B differs from the one shown in FIG. 4A in that both the base 50 and the free ends 51a, 52a of the coupling element 5 each tightly rest against the outer surface 10 of the rope; i.e. protrude from the same to a smaller extent than in the case of FIG. 4A. Such arrangement above all is suitable for press-fitting a rope nipple 2 at the rope 1 in the region of the coupling element 5, so that the rope nipple 2 is positively and frictionally attached to the coupling element 5 in the region of the base 50 and of the free ends 51a, 52a.

Figure 5:
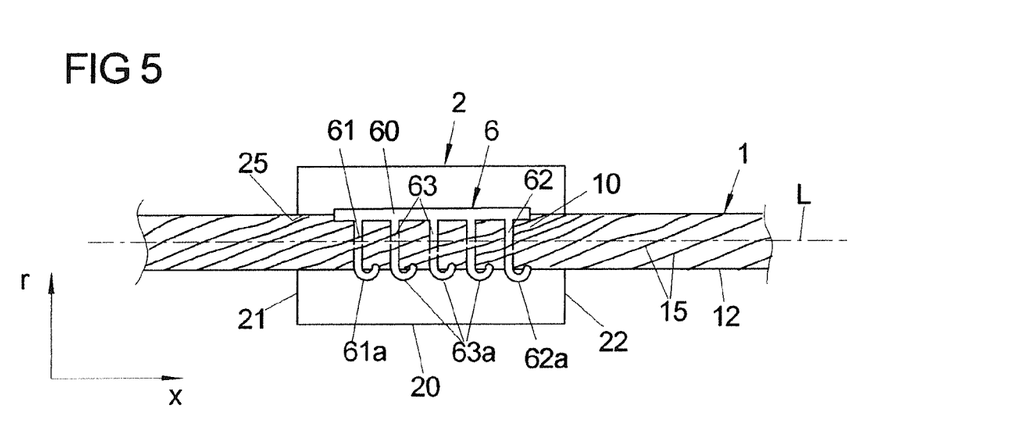
FIG. 5 shows a fourth modification of the embodiment of FIG. 1.

FIG. 5 shows a coupling element 6 in the form of a clamp with a base 60 extending on the outer surface 12 of the rope 1 in direction of extension x of the rope 1, from which a plurality of structural elements 61, 62, 63 protrude transverse to the direction of extension x of the rope 1, which are arranged one beside the other and spaced from each other along the direction of extension x of the rope. Between two outer structural elements 61, 62 a plurality of inner structural elements 63 are located.

Each of the structural elements 61, 62, 63 completely penetrates the rope 1 along a direction r transverse to its direction of extension x and is bent over at its respective free end 61a, 62a, 63a such that the free ends 61a, 62a, 63a of the structural elements 61, 62, 63 each are designed substantially U-shaped and with a (conically tapered) end portion engage in the same in a hook-like manner transverse to the direction of extension x of the rope 1. In this way, the durability of the connection between the coupling element 6 and the rope 1 is increased even further.

Due to the conical design of the structural elements 61, 62, 63 at their free ends 61a, 62a, 63a damages of threads of the rope 1 are also avoided, when the coupling element 6 initially is introduced into the rope transverse to the direction of extension x of the rope, so that the structural elements 61, 62, 63 penetrate the rope 1, until their base 60 finally rests against the outer surface 12 of the rope 1, and subsequently the free ends 61a, 62a, 63a of the structural elements 61, 62, 63 are bent over.

A coupling element 6 of comb-like design of the type shown in FIG. 5 for example can be formed by a stamped sheet-metal part.

Figure 6:
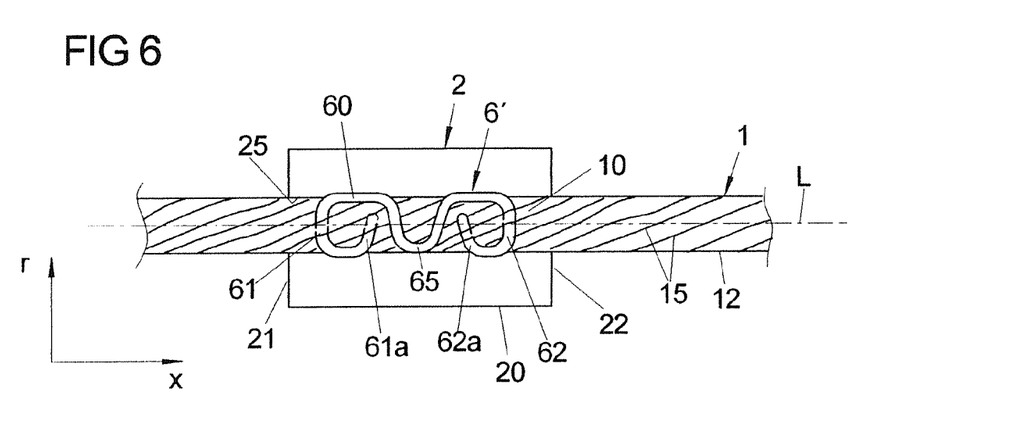
FIG. 6 shows a fifth modification of the embodiment of FIG. 1.

In the embodiment of FIG. 6 two outer structural elements 61, 62 in the form of legs spaced from each other along the direction of extension x (longitudinal direction) of the rope 1 on the one hand protrude from a base 60 (extending on the outer surface 12 of the rope 1 along its direction of extension x) of a coupling element 6' formed by a clamp, which with their free ends 61a, 62a each on a portion of the outer surface 12 of the rope 1 opposite the base 60 are bent into the rope, in so far corresponding to the embodiment of FIG. 5, wherein here, however, the two free ends 61a, 62a are bent over in mutually opposite directions. Between the two leg-shaped structural elements 61, 62 of the coupling element 6 a substantially U-shaped indentation 65 in addition extends from its base 60 up to a portion of the outer surface 12 of the rope 1 opposite the base 60. The two legs of the indentation 65 form additional structural elements which—like the first-mentioned structural elements 61, 62—each penetrate the rope 1 transverse to its direction of extension x.

Figure 7:
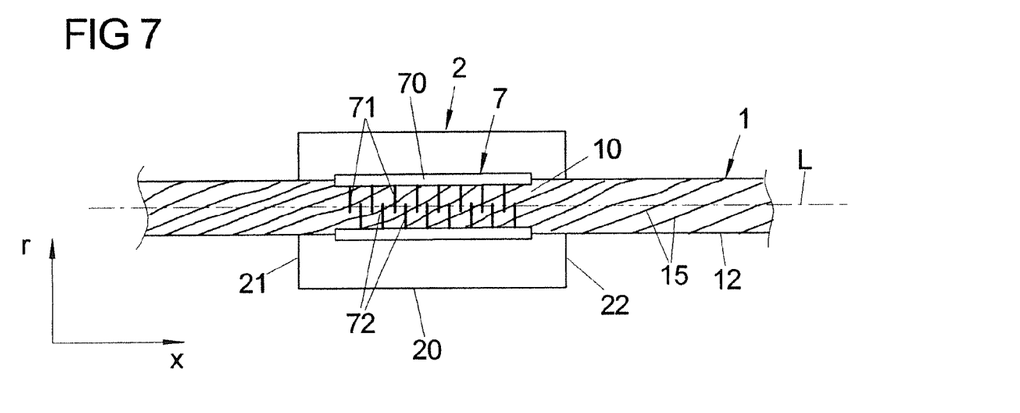
FIG. 7 shows an embodiment of a rope with coupling element, wherein the coupling element encloses the rope on its outer surface and includes structural elements engaging in the rope, and wherein a further component in the form of an interface element is connected to the rope via the coupling element.

In FIG. 7, a coupling element 7 is shown, which as base body includes a shell enclosing the rope 1 on its outer surface 12 (preferably over an angle of at least 180°, but less than) 360°, from which a plurality of pin-like structural elements 71, 72 protrudes in direction towards the rope interior, which each penetrate into the interior of the rope 1 and there reach between individual threads and/or strands 15 of the rope 1. In the present case, the penetration depth of the pin-like protrusions 71, 72 (from the outer surface 12 of the rope 1) into the interior of the rope 1 is slightly less than 50% of the diameter of the rope 1, so that the pin-like structural elements 71, 72 do not touch each other in the interior of the rope 1. However, there can also be provided a greater penetration depth of the pin-like structural elements 71, 72, in particular of more than 50% of the diameter of the rope 1, so that the same get in contact with each other when the shell-like base body 70 of the coupling element 7 is pressed onto the outer surface 12 of the rope 1, and for example can get entangled with each other.

When the structural elements 71, 72 are in engagement in the interior of the rope 1 and support on each other, there are formed supporting bridges to opposed portions (supporting surfaces) of the succeeding component 2, here in the form of a rope nipple, which in turn each support on the coupling element 7.

In all embodiments of FIGS. 5 to 7—as in the case of the arrangements from FIGS. 1 to 3—an interface element 2 provided in the region of the respective coupling element 6, 6', 7, which encloses the rope 1 on its outer surface, for example in the form of a rope nipple, can each be molded onto the connecting portion 10 of the rope 1 and the coupling element 6, 6', 7 provided there or be press-fitted with the connecting portion 10 of the rope 1 and the coupling element 6, 6', 7 provided there.

When the base body 70 of the coupling element 7 from FIG. 7 forms an initially open, ring-like shell which encloses the rope 1 on its outer surface over an angle of less than 360°, it can furthermore be provided that after press-fitting the coupling element 7 with the rope 1 (in the manner of a crimp part), the two free ends of the open base body 70 ring-shaped in cross-section get in contact with each other, and thus the base body 70 of the coupling element 7 ultimately forms a ring which is closed in cross-section. In this respect, details can also be taken from the following FIGS. 8 and 9.

Alternatively, the coupling element 7 of FIG. 7 can also be formed by two partial shells arranged opposite each other on the outer surface 12 of the rope 1. In this case, the penetration depth of the pin-like structural elements 71, 72 of the two partial shells advantageously is chosen such that the former get in contact with each other and get entangled, when the two partial shells are each pressed against the outer surface 12 of the rope 1 in opposite directions (transverse to the direction of extension x of the rope 1).

Figure 8:
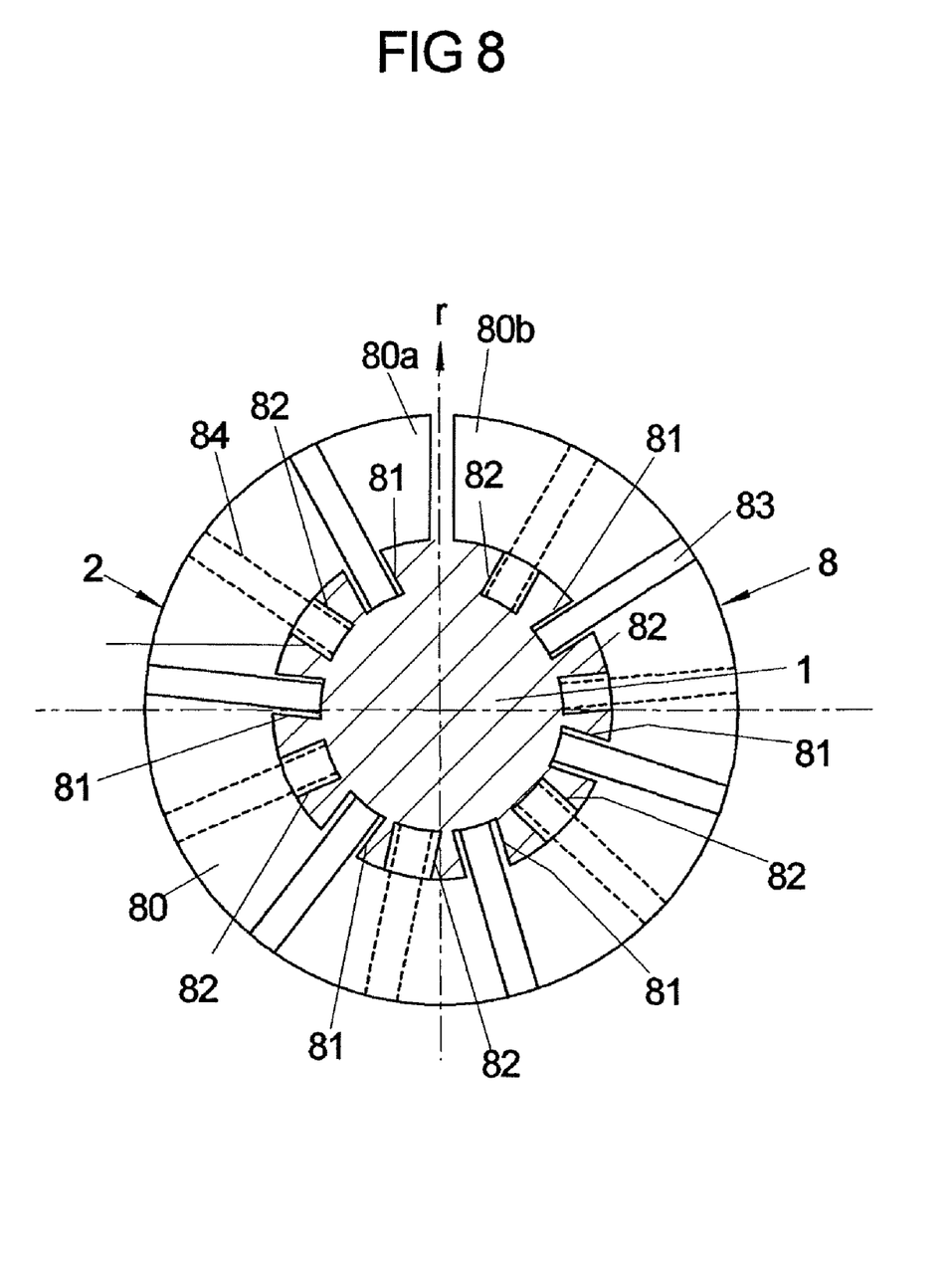
FIG. 8 shows a first modification of the embodiment of FIG. 7 in a cross-section.

FIG. 8 shows a cross-section of an embodiment, in which a coupling element 8 which is attached to a rope 1 can immediately form an interface element 2 in the form of a rope nipple, via which an adjustable part of a motor vehicle, such as the carrier M of a window pane of FIG. 13, can be connected to the rope 1.

For this purpose, the coupling element 8 includes a base body 80 annularly enclosing the rope 1 on its outer surface, which has such an expansion in radial direction r of the rope 1 that it substantially protrudes from the outer surface of the rope and thus for example can be inserted in a nipple chamber of an associated adjustable part, in order to produce a positive connection.

In cross-section, the base body 80 of the coupling element 8 forms an open ring which initially encloses the rope 1 on its outer surface by less than 360°, after the coupling element 8 has been put onto the rope 1.

With a sufficient elasticity of the coupling element 8, putting the coupling element onto the rope 1 can be effected vertical to its direction of extension, wherein the coupling element 8 is spread apart, so that its opposed free ends 80a, 80b move away from each other sufficiently, in order to form a slot which is suitable for introducing the rope therebetween. Assisted by the bias produced when introducing the rope, for example, the coupling element 8 subsequently is brought into the condition shown in FIG. 8, in which the coupling element 8 surrounds the rope 1 with an angle of slightly less than 360°, so that its two free ends 80a, 80b are slightly spaced from each other. The coupling element 8 can be press-fitted with the rope 1, e.g. by crimping, whereby the coupling element 8 with its base body 80 is pressed against the outer surface of the rope 1, and its two free ends 80a, 80b approach each other.

It can likewise be provided that the coupling element 8 initially encloses the associated rope 1 only with an angle of distinctly less than 360°, e.g. in the order of 270°, which facilitates putting the coupling element 8 onto the rope 1, and that the two free ends 80a, 80b of the coupling element 8 are moved towards each other after inserting the rope 1 by press-fitting the coupling element 8 at the rope 1, so that they are only slightly spaced from each other or even engage in each other.

Furthermore, tooth regions or other positive connection regions can be provided at the free ends 80a, 80b of the coupling element 8, which on crimping engage in each other to create a positive connection.

Structural elements 81, 82 protrude from the base body 80 of the coupling element 8 in direction of the interior of the rope 1, which can be designed as rim holes formed by stamping, so that a concentric opening 83, 84 each corresponds with each structural element 81, 82 protruding towards the inside. In the embodiment of FIG. 8, structural elements provided with corresponding reference numerals 81 or 82 each lie in a common cross-sectional plane.

Figure 9:
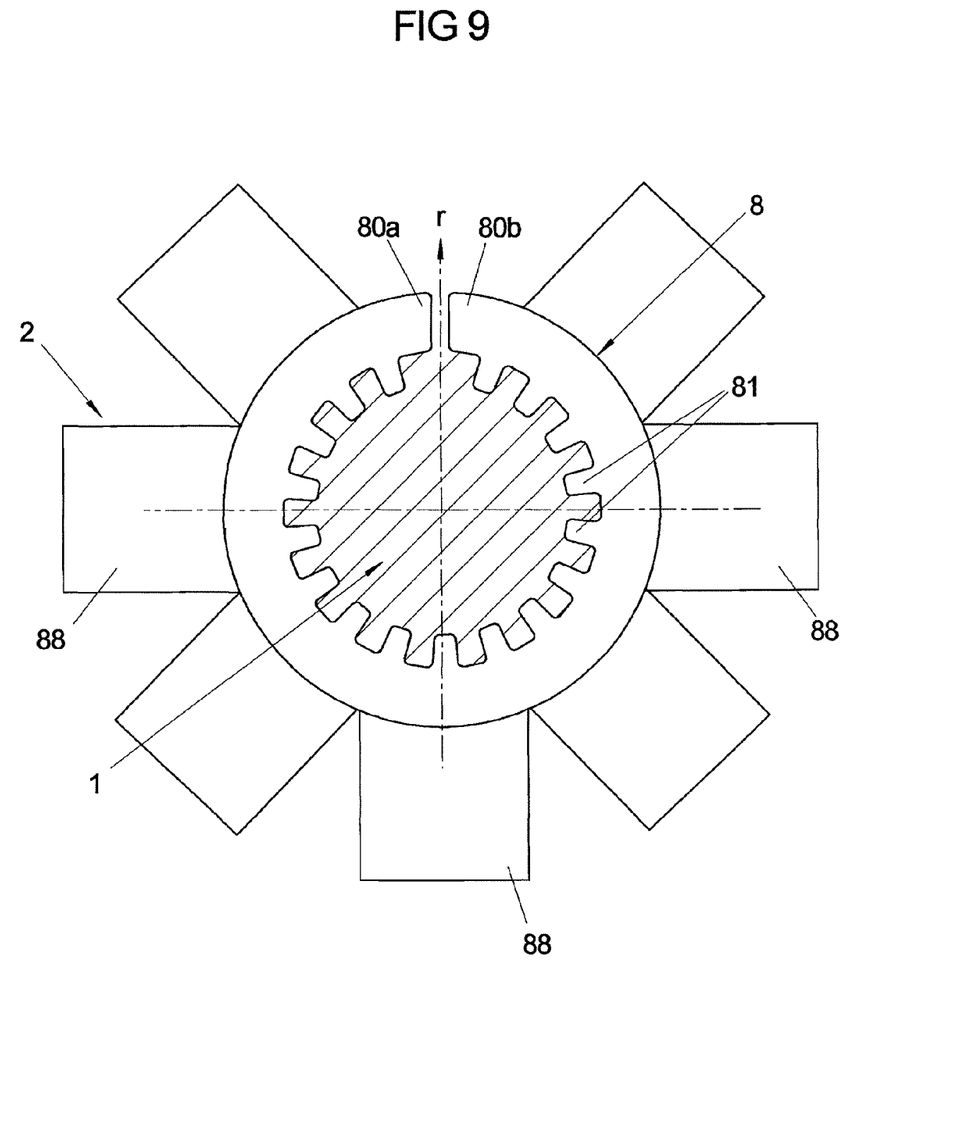
FIG. 9 shows a second modification of the embodiment of FIG. 7 in a cross-section.

FIG. 9 shows a modification of the embodiment of FIG. 8, according to which on the inside of the base body 80 of the coupling element 8 also serving as interface element 2 pin-like structural elements 81 protrude in direction of the interior of the rope 1, which inside the rope 1 each engage between individual threads and/or strands of the rope 1.

The penetration depth of the (pin-like) structural elements 81, 82 of FIG. 9—like the penetration depth of the structural elements 81, 82 (formed by rim holes) of FIG. 8—is distinctly less than 50% of the diameter of the rope 1, in the present case about 10 to 20%.

Furthermore, protrusions 8 protrude from the outside of the coupling element 8 to the outside, i.e. away from the rope 1, which can serve as form-fit elements for producing a positive connection with an associated adjustable part, such as a carrier M of FIG. 13.

Figure 10:
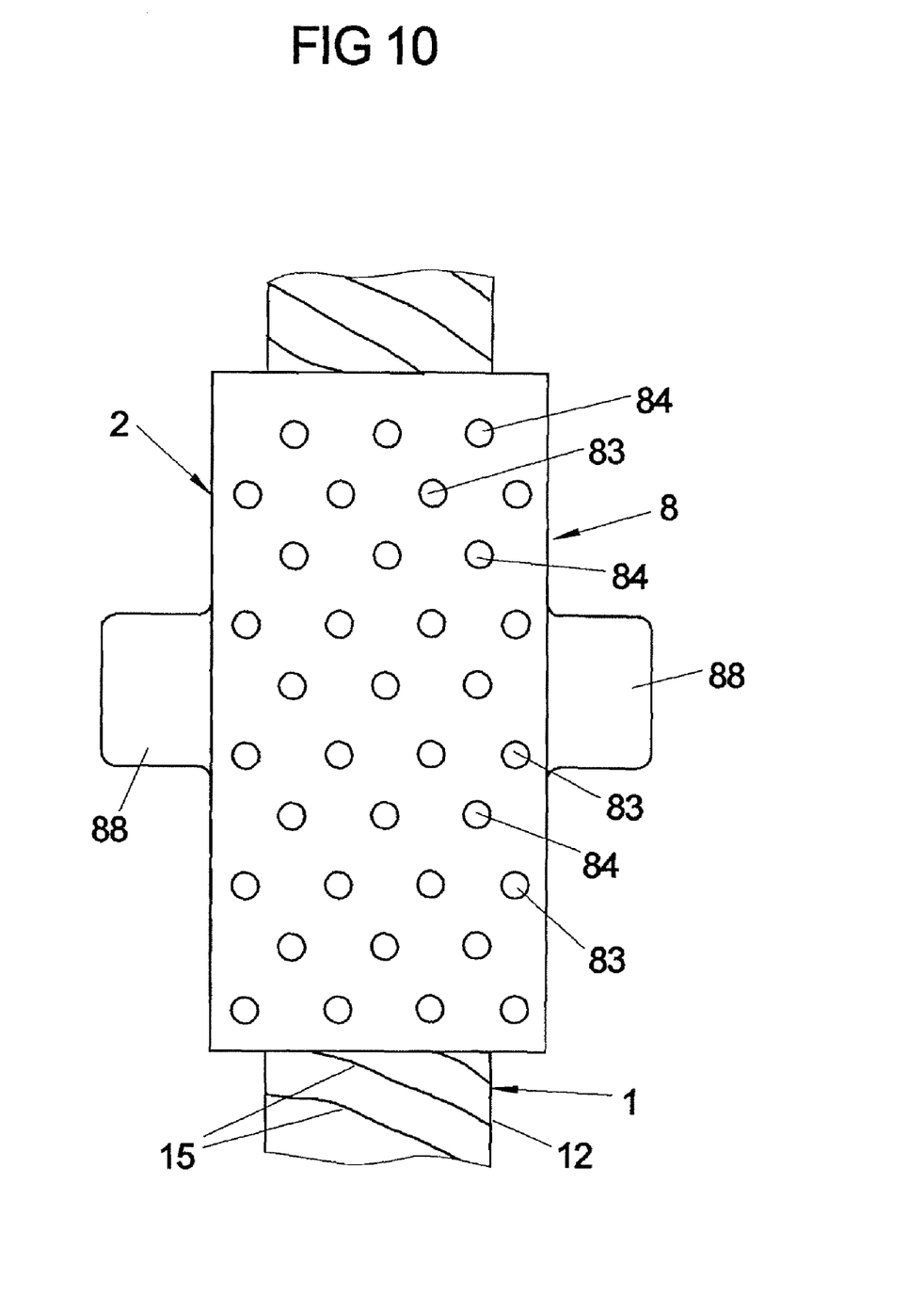
FIG. 10 shows a schematic side view of a variant of the embodiments of FIGS. 8 and 9.

FIG. 10 shows a top view of a rope 1 with a coupling element 8 of the type shown in FIG. 8, wherein here in particular the through openings 83, 84 of the coupling element 8 are shown, which are obtained when forming the rim holes protruding from the coupling element 8 to the inside, see FIG. 8.

In addition, the coupling element 8 of FIG. 10 includes two protrusions 88 protruding to the outside as form-fit elements on its outer circumference, so that the coupling element 8 can also serve as interface element 2, e.g. in the form of a rope nipple, via which an adjustable part, such as the carrier M of FIG. 13, can be connected to the rope 1.

In the embodiments of FIGS. 8 to 10, however, the respective coupling element 8 alternatively can also be provided with a succeeding interface element, e.g. in the form of a rope nipple, which then makes the connection with an adjustable part of a motor vehicle. In this case, the coupling element 8 for example can be overmolded with an interface element, wherein the form-fit elements 88 protruding from the coupling element 8 provide a firm connection between the coupling element 8 and the associated interface element.

The coupling element 8 of FIGS. 8 to 10 for example can be manufactured as a continuously cast or extruded (light metal) part, e.g. on the basis of an aluminum alloy.

In the embodiment of FIGS. 11A to 11D, at least one coupling element 9 in the form of an insert is arranged in the rope 1, which here constitutes an element with a disk-shaped base body 90 from which tooth-like structural elements 91 protrude to the outside. Such coupling element 9 can already be integrated into the rope 1 during its manufacture, in that threads 14 of the rope are guided between the gaps of the teeth formed by the structural elements 91. In this way, a particularly firm, durable connection between the structural element 9 and the rope 1 is achieved.

If the rope 1 is configured with a core, the coupling element 9 can have a (central) through opening 95 in its disk-shaped base body 90, through which the core of the rope can be passed. Alternatively, however, other rope components such as strands/threads of the rope 1 can be passed through the through opening 95 of the coupling element 9.

The structural elements 91 of the coupling element 9 protrude beyond the outer surface 12 of the rope 1 in radial direction, so that there a connection with an associated interface element, such as a rope nipple 2, can be made.

Figure 11A:
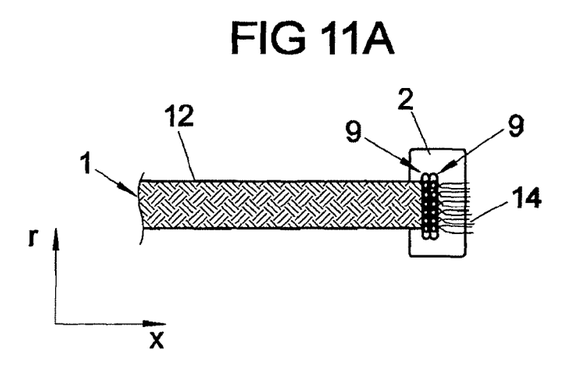
FIG. 11A shows a further embodiment of a rope with coupling element and an interface element thereby connected to the rope.
Figure 11B:
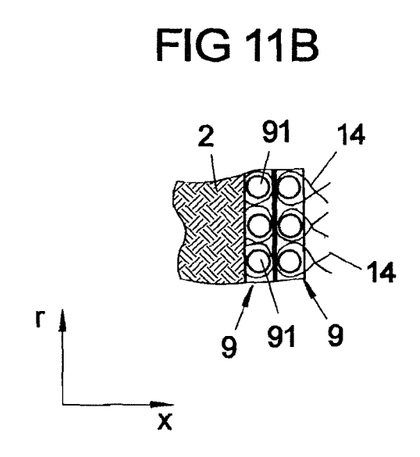
FIG. 11B shows a detail of FIG. 11A.
Figure 11C:
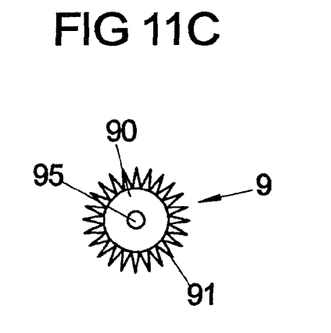
FIG. 11C shows a top view of the coupling element of FIG. 11A.
Figure 11D:
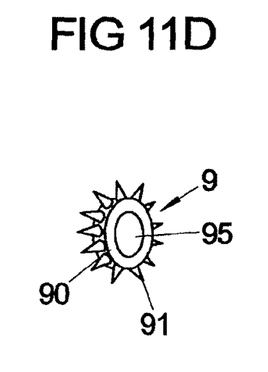
FIG. 11D shows a perspective representation of the coupling element of FIG. 11A.

Here, a plurality of coupling elements 9 arranged one beside the other along the direction of extension x of the rope 1 can be provided, as is each indicated in FIGS. 11A and 11B in the case of two coupling elements 9 arranged one beside the other.

Figure 12:
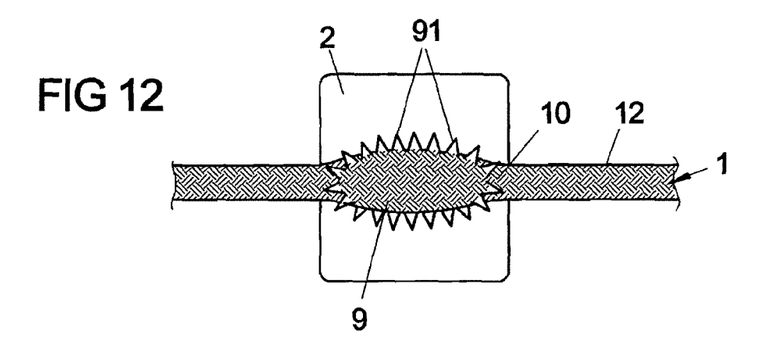
FIG. 12 shows one more embodiment of a rope with coupling element.

FIG. 12 shows a modification of the embodiment of FIGS. 11A and 11B, in which the coupling element 9' has a comparatively large-volume base body 90' with tooth-like structural elements 91 protruding therefrom.

The invention claimed is:

1. A synthetic fiber rope with coupling element for transmitting an adjustment force to an adjustable part to be connected to the rope via the coupling element,
wherein the coupling element is attached to the rope as an element separate from the rope, and wherein the coupling element at least partly engages in an interior of the rope and there engages behind rope components made of synthetic fibers,
wherein the coupling element completely reaches through the rope transverse to the rope's local direction of extension and protrudes beyond an outer surface of the rope, a base of the coupling element resting against the outer surface of the rope and extending along a portion of the outer surface of the rope, and
wherein, the coupling element already being attached to the rope and reaching through it, a succeeding component is attached to the rope and to the coupling element in that it is pressfitted with the coupling element, such that material of the succeeding component is deformed and rope components are compacted in the region of the coupling element.

2. The rope according to claim 1, wherein the rope components include threads formed of synthetic fibers.

3. The rope according to claim 2, wherein the rope components include strands formed of the threads, which are twisted to create the rope.

4. The rope according to claim 3, wherein the coupling element in the interior of the rope reaches between individual strands of the rope.

5. The rope according to claim 2, wherein the coupling element in the interior of the rope reaches between individual threads of the rope.

6. The rope according to claim 1, wherein in the interior of the rope at least one structural element extends transverse to the local direction of extension x of the rope.

7. The rope according to claim 1, wherein the coupling element is an insert arranged in the rope.

8. The rope according to claim 1, wherein the coupling element engages in the interior of the rope with at least one structural element from the outer surface of the rope.

9. The rope according to claim 8, wherein the coupling element engages in the interior of the rope with at least two structural elements spaced from each other along the outer surface of the rope.

10. The rope according to claim 6, wherein at least two structural elements in the interior of the rope are in engagement with each other, so that they support on each other.

11. The rope according to claim 1, wherein the coupling element encloses the rope on its outer surface.

12. The rope according to claim 11, wherein via at least one region protruding from the outer surface of the rope the coupling element can be brought in direct contact with a succeeding component to which a tensile force acting on the rope can be transmitted by means of the coupling element.

13. The rope according to claim 1, wherein the succeeding component at least partly engages behind the coupling element and supports on the same in the direction of extension of the rope.

14. The rope according to claim 1, wherein the coupling element reaches through the rope and that the succeeding component supports on opposed regions of the coupling element each protruding from the outer surface of the rope with at least one surface portion.

15. The rope according to claim 1, wherein the coupling element is made of a material more dimensionally stable than the rope.

16. The rope according to claim 1, wherein the coupling element is made of metal.

17. The rope according to claim 1, wherein the coupling element constitutes a clamp which is fixed to the rope.

18. The rope according to claim 1, wherein the rope is formed and provided as pulling means for transmitting an adjustment force generated by an adjusting drive to an adjustable part of a motor vehicle.

19. A motor vehicle adjusting means for adjusting an adjustable part of a motor vehicle, comprising a flexible pulling means in the form of a rope which on the one hand is operatively connected with an adjusting drive of the adjusting means and to which on the other hand the adjustable part is to be connected, further comprising a formation of the rope according to claim 1.

20. A method for attaching a coupling element to a rope, which serves for transmitting an adjustment force acting on the rope to an adjustable part associated to the rope, wherein the coupling element is arranged on a connecting portion of the rope, to which the adjustable part is to be connected, wherein
a) the coupling element is positioned at the connecting portion of the rope and at least one structural element of the coupling element is introduced into the rope, so that in the interior of the rope it engages behind at least one rope component and the coupling element completely reaches through the rope transverse to the rope's local direction of extension and protrudes beyond an outer surface of the rope, a base of the coupling element resting against the outer surface of the rope and extending along a portion of the outer surface of the rope,
b) an examination of the position of the coupling element on the rope is made for correspondence with a specified intended position and
c) the coupling element is subsequently connected with a succeeding component by pressfitting the succeeding component with the coupling element, such that material of the succeeding component is deformed and rope components are compacted in the region of the coupling element.

21. The method according to claim 20, wherein a synthetic fiber rope is used and engages behind rope components made of synthetic fibers in the interior of the rope.

22. The rope according to claim 6, wherein in the interior of the rope a plurality of structural elements extends transverse to the local direction of extension of the rope.

23. The rope according to claim 18, wherein the rope is formed and provided as pulling means for transmitting an adjustment force generated by an adjusting drive to an adjustable carrier of a window pane, of a sliding roof or of a seat part of a motor vehicle.

* * * * *